(12) United States Patent
Parrish et al.

(10) Patent No.: US 8,980,410 B2
(45) Date of Patent: Mar. 17, 2015

(54) THERMALLY CONDUCTIVE SHEET AND ASSOCIATED METHODS

(71) Applicant: Lighting Science Group Corporation, Satellite Beach, FL (US)

(72) Inventors: Clyde F. Parrish, Trinity, FL (US); Fredric S. Maxik, Indialantic, FL (US); David E. Bartine, Cocoa, FL (US)

(73) Assignee: Lighting Science Group Corporation, Melbourne, FL (US)

( * ) Notice: Subject to any disclaimer, the term of this patent is extended or adjusted under 35 U.S.C. 154(b) by 0 days.

(21) Appl. No.: 14/205,620

(22) Filed: Mar. 12, 2014

(65) Prior Publication Data

US 2014/0272330 A1  Sep. 18, 2014

Related U.S. Application Data

(60) Provisional application No. 61/791,487, filed on Mar. 15, 2013.

(51) Int. Cl.
| | |
|---|---|
| *B32B 3/00* | (2006.01) |
| *C08J 5/18* | (2006.01) |
| *B32B 7/04* | (2006.01) |
| *C08J 5/12* | (2006.01) |

(52) U.S. Cl.
CPC ... *C08J 5/18* (2013.01); *B32B 7/04* (2013.01); *C08J 5/121* (2013.01); *B32B 2264/108* (2013.01); *B32B 2264/12* (2013.01); *B32B 2264/0264* (2013.01); *B32B 2307/302* (2013.01); *C08J 2377/00* (2013.01)
USPC ...... 428/195.1; 428/201; 428/206; 428/473.5

(58) Field of Classification Search
CPC .. B32B 7/04; B32B 2264/12; B32B 2264/108
USPC .................................................. 428/201, 206
See application file for complete search history.

(56) References Cited

U.S. PATENT DOCUMENTS

| | | | |
|---|---|---|---|
| 6,764,617 B1 | 7/2004 | Viswanathan et al. | |
| 6,972,098 B1 | 12/2005 | Viswanathan | |
| 7,179,404 B1 | 2/2007 | Viswanathan | |
| 2005/0014925 A1* | 1/2005 | Yokota et al. | 528/353 |
| 2010/0247888 A1* | 9/2010 | Nishiura et al. | 428/220 |
| 2012/0156459 A1* | 6/2012 | Lu et al. | 428/216 |

* cited by examiner

*Primary Examiner* — Elizabeth Mulvaney
(74) *Attorney, Agent, or Firm* — Mark R. Malek; Daniel C. Pierron; Widerman Malek, PL

(57) ABSTRACT

A thermally conductive sheet may include an electrically insulative bottom film, an electrically insulative top film, and an intermediate layer positioned between the bottom film and the top film. The intermediate layer may include a mixture of granulated thermally conductive material and granulated electrically insulating polymer. The granulated electrically insulating polymer is adapted to form a polyimide bridge between the bottom film and the top film.

21 Claims, 4 Drawing Sheets

THERMALLY CONDUCTIVE SHEET AND ASSOCIATED METHODS

RELATED APPLICATIONS

This application claims the benefit under 35 U.S.C. §119 (e) of U.S. Provisional Patent Application Ser. No. 61/791,487, filed on Mar. 15, 2013, titled Thermally Conductive Sheet and Associated Methods, the content of which is incorporated by reference herein except to the extent disclosure made therein is inconsistent with disclosure made herein.

FIELD OF THE INVENTION

The present invention relates to the field of thermal conductivity and, more specifically, to the field of thermally conductive sheets.

BACKGROUND OF THE INVENTION

It is well known that conductive sheets can be prepared by mixing a thermal conductor with an electrically insulating polymer to bind the thermal conductor together in the form of a sheet. It is also well known that conductive sheets prepared by mixing a thermal conductor with an electrically insulating polymer suffer from reduced thermal conductivity. Examination of the thermal conductor particle-to-particle contacts in the prior art shows that the reason for this reduced thermal conductivity is that the electrically insulating polymer film is interposed between the thermal conductor particles. Since polymers are poor thermal conductors, the sheet's thermal conductivity is reduced each time the heat flows through the polymer film interposed between the graphite particles.

There exists a need to provide a conductive sheet that does not suffer from reduced conductivity as the result of interposing electrically insulating polymer between the thermal conductor particles.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

Such needs are addressed in the present invention. The thermally conductive sheet of an embodiment of the present invention may advantageously provide a sheet with a substantially uninterrupted thermally conductive path. The thermally conductive sheet of an embodiment of the present invention may be directly connected to a heat sink by way of the thermal conductor if no electrical insulation is required. The thermally conductive sheet of another embodiment of the present invention may be connected to a heat sink by way of the outer polymeric surface if electrical insulation is required. A method of preparing a thermally conductive sheet according to an embodiment of the present invention may also be provided.

These and other objects, features and advantages according to an embodiment of the present invention are provided by a thermally conductive sheet that may comprise a top film of electrically insulating polymer connected by at least one electrically insulating polymer bridge to a bottom film of electrically insulating polymer, with a layer of a granulated thermal conductor mixed with a granulated electrically insulating polymer disposed therein, to define a sandwich structure. A method of preparing a thermally conductive sheet that does not suffer from reduced thermal conductivity according to an embodiment of the present invention may also be provided. The method may comprise casting a top film of electrically insulating polymer, casting a bottom film of electrically insulating polymer, evaporating a solvent from the top film and the bottom film to a point of tackiness, depositing a layer of a granulated thermal conductor mixed with a granulated electrically insulating polymer on the bottom film, placing the top film on the layer of the granulated thermal conductor and the granulated electrically insulating polymer to define a sandwich structure, and heating the sandwich structure to a point where water is evaporated.

Furthermore, an embodiment of the invention may be a thermally conductive sheet comprising an electrically insulative bottom film, an electrically insulative top film, and an intermediate layer positioned between the bottom film and the top film. The intermediate layer may comprise a mixture of granulated thermally conductive material and granulated electrically insulating polymer. Additionally, the granulated electrically insulating polymer may be adapted to form a polyimide bridge between the bottom film and the top film. In some embodiments, at least one of the bottom film and the top film may retain solvent when positioned adjacent to the intermediate layer. Further, the solvent may comprise N-methyl pyrolidinone.

In some embodiments, at least one of the bottom film and the top film may comprise polyamic acid. The polyamic acid may be a product of reacting pyromellitic dianhydride with 1,12-diaminododecane. The intermediate layer may comprise a portion of the product. Furthermore, the polyamic acid may be a product of dissolving 5 mmol of 1,12 diaminododecane in 15 mL of N-methyl-2-pyrrolidinone, adding 5 of mmol pyromellitic dianhydride, heating, and dissolving therein N-methyl pyrrolidinone.

In some embodiments, the mixture of granulated thermally conductive material and granulated electrically insulating polymer may comprise from 1% to 3% granulated electrically insulative polymer. The granulated thermal conductor may be graphite. Furthermore, the intermediate layer may be uniformly distributed on an upper surface of the bottom film. The intermediate layer may comprise strips of different concentrations of the granulated thermal conductor.

An embodiment of the invention comprises a method of fabricating a thermally conductive sheet, the method comprising the steps of casting a bottom film of electrically insulating polymer, casting a top film of electrically insulating polymer, evaporating solvent from the bottom and top films to the point the bottom and top films are tacky, depositing a mixture of a granulated thermal conductor and a granulated electrically insulating polymer on a top surface of the bottom film, and placing the top film on the mixture, defining a sandwich structure. The method may further comprise the step of heating the sandwich structure. In some embodiments, the step of heating may comprise heating the sandwich structure to a point where the bottom film is converted to a film of a polyimide and the top film is converted to a film of a polyimide. Furthermore, the step of heating may comprise heating the sandwich structure to the point that the top and bottom polyimide sheets are bonded together by at least one polyimide bridge. In some embodiments, the step of heating the sandwich structure comprises heating the sandwich structure to the point that water evaporates.

In some embodiments, at least one of the top and bottom films may be formed from a substance that includes polyamic acid, the polyamic acid being formed by the step of reacting pyromellitic dianhydride with 1,12-diaminododecane. Additionally, the step of reacting pyromellitic dianhydride with 1,12-diaminododecane may comprise the steps of dissolving 5 mmol of 1,12-diaminododecane in 15 mL of N-methyl-2-pyrrolidinone, adding 5 mmol of pyrometallic dianhydiride, heating to reflux, and dissolving therein N-methyl pyrrolidinone. Furthermore, the step of heating to reflux may comprise heating to reflux for about 15 hours. In some embodiments, the method may further comprise the step of drying a portion of the polyamic acid.

DETAILED DESCRIPTION OF THE PREFERRED EMBODIMENT

Figure 1:
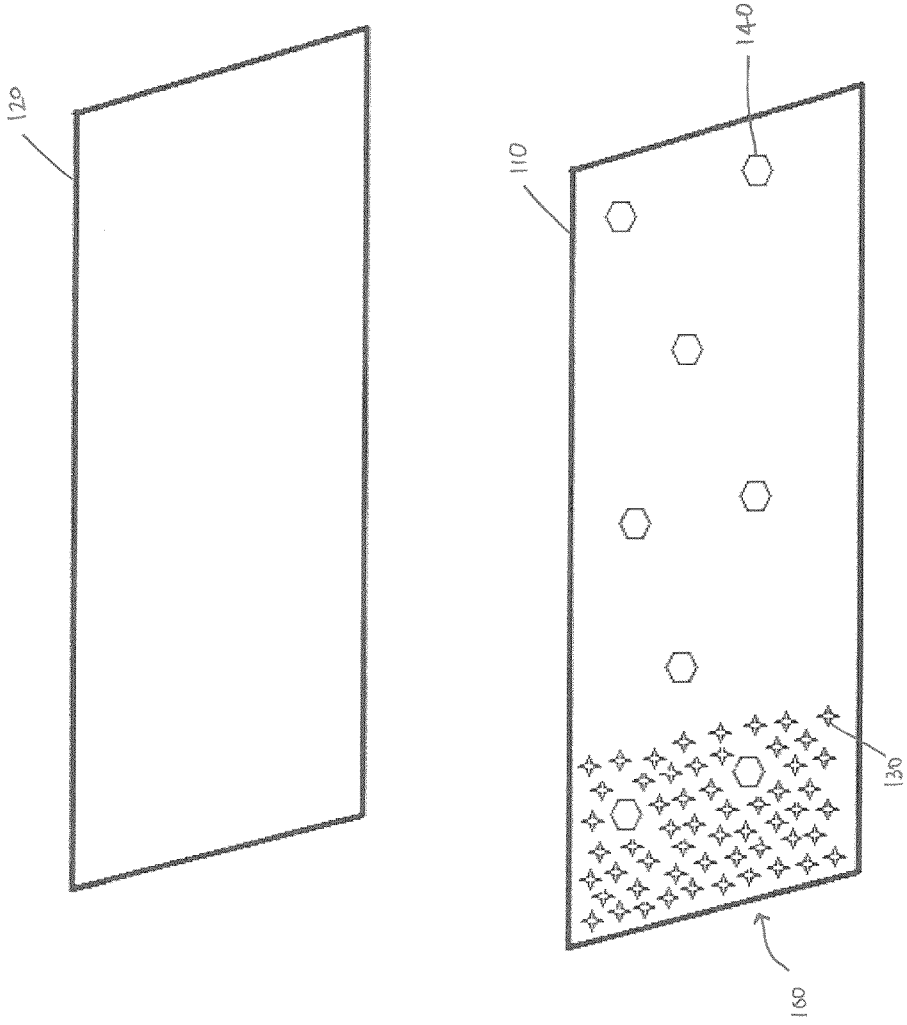
FIG. 1 is an exploded perspective of a thermally conductive sheet according to an embodiment of the present invention.

The present invention will now be described fully hereinafter with reference to the accompanying drawings, in which preferred embodiments of the invention are shown. Like numbers refer to like elements throughout. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art will realize that the following embodiments of the present invention are only illustrative and are not intended to be limiting in any way. Other embodiments of the present invention will readily suggest themselves to such skilled persons having the benefit of this disclosure.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

A thermally conductive sheet 100 according to an embodiment of the present invention can advantageously provide a sheet with a substantially uninterrupted thermally conductive path. More specifically, the thermally conductive sheet 100 according to the present invention advantageously provides thermal conductor particle-to-particle contacts without an electrically insulating polymer film interposed between the thermal conductor particles. This is accomplished by selectively controlling the concentration of a granulated electrically insulating polymer within a mixture of a granulated thermal conductor and the granulated electrically insulating polymer, by depositing the mixture on a bottom film of electrically insulating polymer that has been made tacky, by placing a top film of electrically insulating polymer that has been made tacky on top of the mixture to define a sandwich structure, and by heating the sandwich structure to a point where water evaporates. Additionally, the thermally conductive sheet 100 according to an embodiment of the present invention can advantageously provide either an electrically insulated connection to a heat sink, or an electrically un-insulated connection to a heat sink by selectively varying a point of connection between the electrically insulating film or the thermal conductor, respectively. A method of producing a thermally conductive sheet 100 is also provided.

Figure 2:
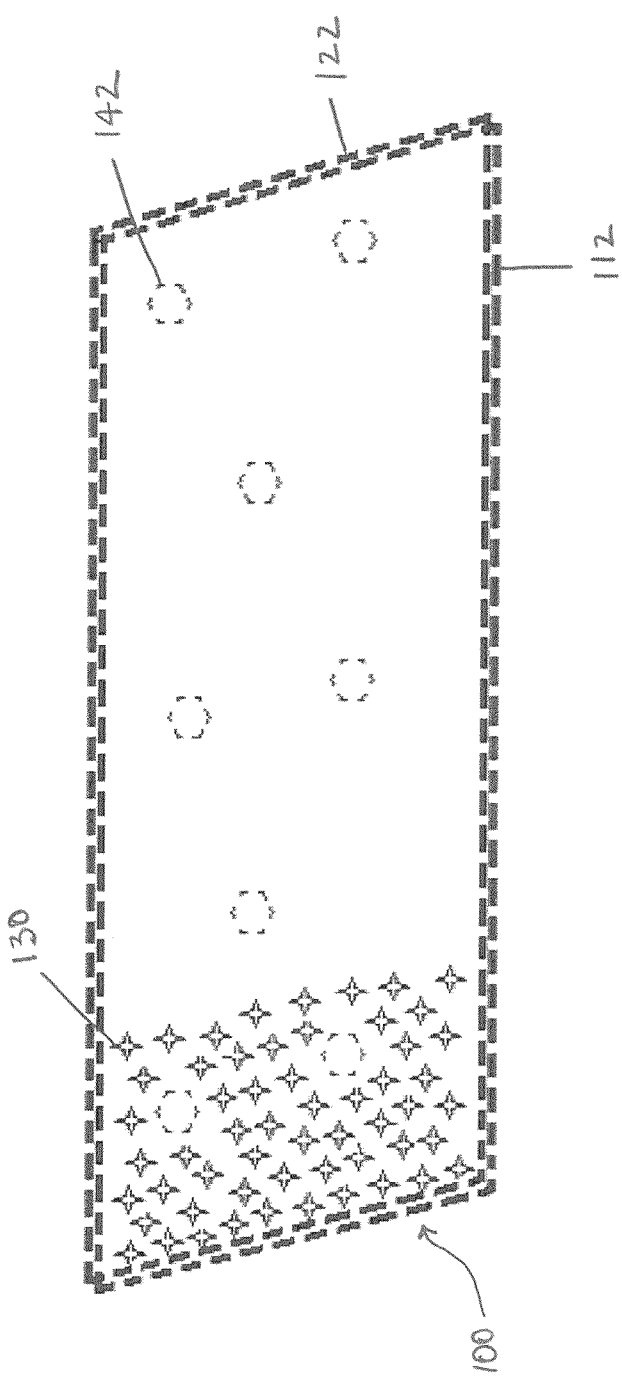
FIG. 2 is a perspective view of the thermally conductive sheet illustrated in FIG. 1 in a sandwich configuration.

Referring to FIGS. 1-2, general details of the thermally conductive sheet 100 according to an embodiment of the present invention are now described. As will be discussed in greater detail below, the unique design of the thermally conductive sheet 100 includes a bottom film of an electrically insulating polymer 110, a top film of the electrically insulating polymer 120, and a mixture of a granulated thermal conductor 140 and a granulated electrically insulating polymer 150, to define a sandwich system. The sandwich system may by heated to a point where water evaporates. After heating, the granulated electrically insulating polymer 150 may be converted to at least one polyimide bridge 152, the bottom film of the electrically insulated polymer may be converted to a bottom film of a polyimide 112, and the top film of the electrically insulating polymer 120 may be converted to a top film of the polyimide 122.

Individual portions of the thermally conductive sheet 100 according to an embodiment of the present invention will now be discussed in greater detail. As depicted in FIG. 1, in one embodiment of the thermally conductive sheet 100, a bottom film of an electrically insulated polymer 110 may be covered with a layer of a mixture of a granulated thermal conductor 130 and a granulated electrically insulated polymer 140. A top film of the electrically insulated polymer 120 may be placed on the layer of the mixture of the granulated thermal conductor 130 and the granulated electrically insulated polymer 140 to define a sandwich structure. The bottom film 110 and the top film 120 may have a sufficient amount of solvent retained thereon to keep the bottom film and the top film tacky. The bottom film 110 and the top film 120 may be cast from polyamic acid. The solvent retained on the bottom film 110 and the top film 120 may be N-methyl pyrolidinone. The granulated electrically insulated polymer 140 may be granulated polyamic acid. The granulated thermal conductor 130 may be granulated graphite.

Figure 3:
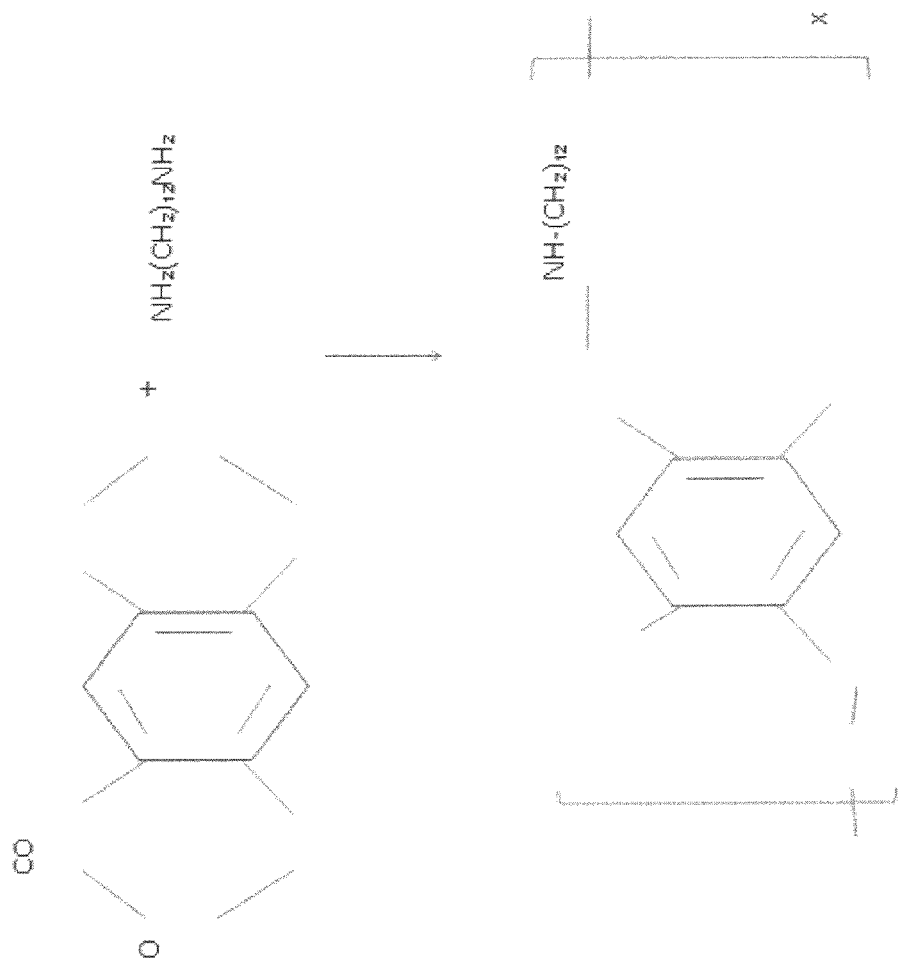
FIG. 3 is a depiction of the chemical reaction producing polyamic acid.

As depicted in FIG. 3, the polyamic acid may be prepared by reacting pyromellitic dianhydride with 1,12-diaminododecane to form the polyamic acid. 5 mmol of 1,12-diaminododecane may be dissolved in 15 mL of N-methyl-2-pyrrolidinone (NMP) in a 50 mL flask equipped with a drying tube, condenser, and nitrogen purge. Next, 5 mmol of pyromellitic dianhydride may be slowly added and stirred overnight, giving a viscous solution. Next the solution may be heated to reflux for 15 hrs, and then N-methyl pyrolidinone (NMP) may be dissolved in. Films of the polyamic acid may be cast from the solution and NMP may be partially evaporated from the film to give the desired tacky consistency. A small portion of the polyamic acid solution may be dried completely to prepare the granular material for bonding the films together.

Figure 4:
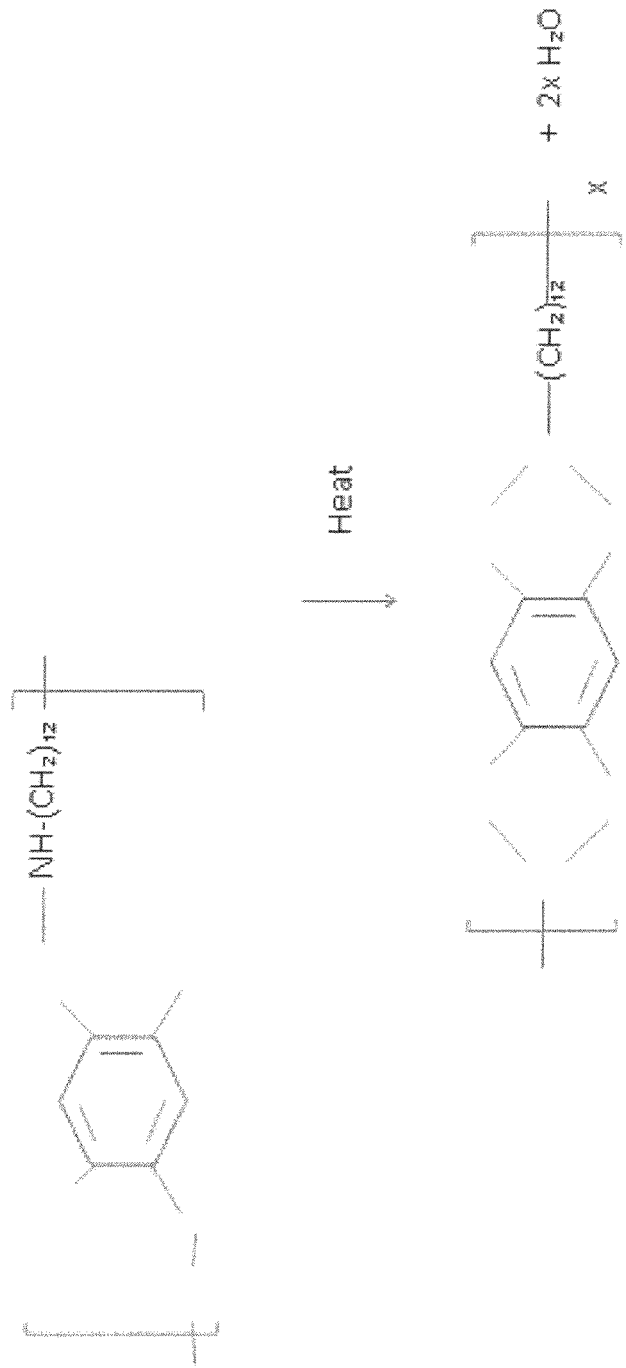
FIG. 4 is a depiction of the chemical reaction producing polyimide and water.

As depicted in FIG. 4, when polyamic acids are heated, they lose water and form polyimides. The sandwich structure may be heated to the point that water evaporates. The bottom film of the electrically insulating polymer 110 may be converted to a bottom film of a polyimide 112. The top film of the electrically insulated polymer 120 may be converted to a top film of the polyimide 122. The granulated electrically insulating polymer 140 may converted to form at least one polyimide bridge 142 between the top film of polyimide 122 and the bottom film of polyimide 112. The end result after heating may be a sandwich structure that contains a layer of graphite particles in contact with each other without any polymer film between the graphite particles and top and bottom polyimide sheets that are bonded together by polyimide bridges.

As depicted in FIG. 2, the thermally conductive sheet 100 according to an embodiment of the present invention may include, after heating the sandwich structure, a layer of granulated thermal conductor 130 enclosed within the top film of the polyimide 122 connected by at least one polyimide bridge 142 to the bottom film of the polyimide 112. The top film 122, the bottom film 112 and the at least one polyimide bridge 142 are represented by broken lines in FIG. 2, representing their conversion from the equivalent electrically insulating polymer components in FIG. 1.

After having had the benefit of reading this disclosure, those skilled in the art will appreciate that the granulated thermal conductor 130, while illustratively depicted in FIGS. 1-2 as only being deposited on a distal portion of an upper surface of the bottom film 110, is preferably uniformly deposited on an entirety of the upper surface of the bottom film. While uniform deposition is preferred, those skilled in the art will appreciate that strips of different concentrations of the mixture of granulated thermal conductor 130 and granulated electrically insulated polymer 140 could be deposited on the bottom film 110 in order to create discrete channels of conductivity while still accomplishing the goals, features and objectives according to the present invention. Likewise, those skilled in the art will appreciate that the granulated electrically insulating polymer 140, while illustratively depicted in FIG. 1 as being provided by only eight particles, preferably makes up between one percent (1%) and three percent (3%) of the mixture of the granulated thermal conductor 130 and the granulated electrically insulating polymer. While the specified concentration range is preferred, those skilled in the art will appreciate that the concentration of the granulated electrically insulating polymer in the mixture could be selectively increased in order to selectively reduce conductivity while still accomplishing the goals, features and objectives according to the present invention. Similarly, those skilled in the art will also appreciate that the at least one polyimide bridge 142, while illustratively depicted in FIG. 2 as being provided by eight polyimide bridges, may be provided by any number of polyimide bridges but preferably approximates the number of polyimide bridges that, upon heating to the point of evaporating water, would be converted from granulated electrically insulating polymer 130 making up between one percent (1%) and three percent (3%) of the mixture of the granulated thermal conductor 130 and the granulated electrically insulating polymer. While the specified conversion of the specified concentration range is preferred, those skilled in the art will appreciate that the conversion of a more concentrated mixture could result in a more structurally sound sandwich structure, while still accomplishing the goals, features and objectives according to the present invention.

A method of preparing a thermally conductive sheet 100 according to an embodiment of the present invention may also be provided. The method may include casting a bottom film of an electrically insulating polymer, casting a top film of the electrically insulating polymer, and evaporating a solvent from the top film and the bottom film to a point where the top film and the bottom film are tacky. The method may also include depositing a layer of a mixture of a granulated thermal conductor and a granulated electrically insulating polymer on a top surface of the bottom film, and placing the top film on the layer of the mixture of the granulated thermal conductor and the granulated electrically insulating polymer to define a sandwich structure. The method may further include heating the sandwich structure. The electrically insulating polymer may be polyamic acid. The solvent may be N-methyl pyrolidinone. The granulated thermal conductor may be graphite. The sandwich structure may be heated to a point where water evaporates. The granulated polyamic acid may make up between one percent (1%) and three percent (3%) of the mixture of the granulated graphite and the granulated polyamic acid.

Throughout this disclosure, all references to "tackiness" or "tacky" are meant to describe a condition where adhesion occurs.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A thermally conductive sheet comprising:
an electrically insulative bottom film;
an electrically insulative top film; and
an intermediate layer positioned between the bottom film and the top film;
wherein the intermediate layer comprises a mixture of granulated thermally conductive material and granulated electrically insulating polymer; and wherein the granulated electrically insulating polymer is adapted to form a polyimide bridge between the bottom film and the top film.

2. The thermally conductive sheet of claim 1 wherein at least one of the bottom film and the top film retains solvent when positioned adjacent to the intermediate layer.

3. The thermally conductive sheet of claim 2 wherein the solvent comprises N-methyl pyrolidinone.

4. The thermally conductive sheet of claim 1 wherein at least one of the bottom film and the top film comprises polyamic acid.

5. The thermally conductive sheet of claim 4 wherein the polyamic acid is a product of reacting pyromellitic dianhydride with 1,12-diaminododecane.

6. The thermally conductive sheet of claim 5 wherein the intermediate layer comprises a portion of the product.

7. The thermally conductive sheet of claim 4 wherein the polyamic acid is a product of dissolving 5 mmol of 1,12 diaminododecane in 15 mL of N-methyl-2-pyrrolidinone, adding 5 of mmol pyromellitic dianhydride, heating, and dissolving therein N-methyl pyrrolidinone.

8. The thermally conductive sheet of claim 1 wherein the mixture of granulated thermally conductive material and granulated electrically insulating polymer comprises from 1% to 3% granulated electrically insulative polymer.

9. The thermally conductive sheet of claim 1 wherein the granulated thermal conductor is graphite.

10. The thermally conductive sheet of claim 1 wherein the intermediate layer is uniformly distributed on an upper surface of the bottom film.

11. The thermally conductive sheet of claim 1 wherein the intermediate layer comprises strips of different concentrations of the granulated thermal conductor.

12. A method of fabricating a thermally conductive sheet comprising the steps of:
    casting a bottom film of electrically insulating polymer;
    casting a top film of electrically insulating polymer;
    evaporating solvent from the bottom and top films to the point the bottom and top films are tacky;
    depositing a mixture of a granulated thermal conductor and a granulated electrically insulating polymer on a top surface of the bottom film; and
    placing the top film on the mixture, defining a sandwich structure.

13. The method of claim 12 further comprising the step of heating the sandwich structure.

14. The method of claim 13 wherein the step of heating comprises heating the sandwich structure to a point where the bottom film is converted to a film of a polyimide and the top film is converted to a film of a polyimide.

15. The method of claim 14 wherein the step of heating comprises heating the sandwich structure to the point that the top and bottom polyimide sheets are bonded together by at least one polyimide bridge.

16. The method of claim 13 wherein the step of heating the sandwich structure comprises heating the sandwich structure to the point that water evaporates.

17. The method of claim 12 wherein at least one of the top and bottom films is formed from a substance that includes polyamic acid, the polyamic acid being formed by the step of reacting pyromellitic dianhydride with 1,12-diaminododecane.

18. The method of claim 17 wherein the step of reacting pyromellitic dianhydride with 1,12-diaminododecane comprises the steps of:
    dissolving 5 mmol of 1,12-diaminododecane in 15 mL of N-methyl-2-pyrrolidinone;
    adding 5 mmol of pyrometallic dianhydiride;
    heating to reflux; and
    dissolving therein N-methyl pyrrolidinone.

19. The method of claim 18 wherein the step of heating to reflux comprises heating to reflux for about 15 hours.

20. The method of claim 19 further comprising the step of drying a portion of the polyamic acid.

21. A thermally conductive sheet comprising:
    an electrically insulative polyimide bottom film;
    an electrically insulative polyimide top film; and
    an intermediate layer positioned between the bottom film and the top film;
    wherein the intermediate layer comprises a mixture of granulated thermally conductive material and granulated electrically insulating polymer;
    wherein the granulated electrically insulating polymer is adapted to form a polyimide bridge between the bottom film and the top film;
    wherein each of the top and bottom films are formed from a substance that includes polyamic acid, the polyamic acid being formed by the step of reacting pyromellitic dianhydride with 1,12-diaminododecane;
    wherein the top and bottom polyimide sheets are bonded together by at least one polyimide bridge; and
    wherein the mixture of granulated thermally conductive material and granulated electrically insulating polymer comprises from 1% to 3% granulated electrically insulative polymer.

* * * * *